3,034,948
SOIL FUMIGATION EMPLOYING 1-BROMO-3-CHLOROPROPANE
Richard C. Nametz, St. Louis, Mich., assignor to Michigan Chemical Corporation, St. Louis, Mich., a corporation of Michigan
No Drawing. Filed Aug. 14, 1958, Ser. No. 754,921
7 Claims. (Cl. 167—22)

This invention relates to the fumigation of soil for the destruction of nematodes and other soil-inhabiting invertebrate, agricultural pests which damage or destroy the underground parts of plants.

The destruction of the underground portions of plants by nematodes and other soil-inhabiting invertebrates, such as, wire worms, maggots, grubs and the like, is a major agricultural problem in both field and green-house operations. Numerous methods for the control of nematodes and other soil-inhabiting invertebrates have been investigated for both field and green-house uses. Quarantines have been ineffective in preventing the spread of these organisms. Flooding and the planting of bait crops have proven uneconomically attractive for large scale operation. The treatment of soil with aqueous solutions of poisons has resulted in leaving the soil unfit for planting for long periods of time. The steaming of green-house soil to destroy nematodes has proven to be time-consuming and expensive.

The fumigation of soil by the application of volatile, organic chemicals for the destruction of nematodes and other soil-infesting invertebrates has been the subject of extreme investigation. The requirements for a satisfactory soil fumigant are difficult to meet. It must be effective in the destruction of the nematodes and other invertebrate pests, without leaving the soil poisoned for any extended period of time. It must be capable of application to the soil without undue hazard to man and animals. Further, it must be economical to use.

Methyl bromide has long been used as a disinfectant for grain, due to its powerful toxic effect on invertebrates but is difficult to use for the fumigation of soil due to its high volatility. The demonstrated value of methyl bromide as a toxic agent for the control of invertebrate pests has led to the development of less volatile bromine compounds for soil fumigation. Ethylene dibromide and 1-chloro-2,3-dibromopropane have been found to be effective in the destruction of nematodes and are used commercially for this purpose. These compounds are relatively expensive to produce with the result that for economical operation the quantity applied to the soil must be kept to relatively low level. When applied in economically feasible amounts these compounds leave much to be desired from the standpoint of their migration through the soil to destroy nematodes remote from the exact point at which they are applied.

It is an object of this invention to provide an improved composition and a method for the fumigation of soil for the destruction of nematodes and other soil-inhabiting invertebrate agricultural pests which damage or destroy the underground portions of plants, which permits the immediate utilization of the treated soil.

An additional object is to provide a composition and a method for the fumigation of soil which utilizes a toxic agent adapted to be applied without particular hazard to man and animals which is more effective than the toxic agents heretofore employed in its destruction of nematodes and other soil-inhabiting, invertebrate agricultural pests, at locations remote from its exact point of application.

Another object is to provide a composition and a method for the fumigation of soil which is effective for the destruction of nematodes of different species, as well as other soil-inhabiting invertebrate, agricultural pests, which is rapid in such destruction and which permits the utilization of the soil for crop purposes in a relatively short time after the fumigation.

Other objects of this invention and its various advantageous features will become apparent as this description proceeds.

The composition in accordance with this invention is adapted for application to soil to destroy nematodes and other soil-inhabiting, invertebrate, agricultural pests and comprises trimethylene chlorobromide and a horticultural carrier. Trimethylene chlorobromide, otherwise known as 1-bromo-3-chloropropane is highly effective when used as the sole toxic ingredient in this composition and is equally effective when used in admixture with other toxic compounds, such as, for example, methyl bromide, ethylene dibromide, ethyl bromide, 2-bromo-1-chloropropane, 1-chloro-2,3-dibromopropane and similar materials. For reasons mentioned below, I prefer to use a crude trimethylene chlorobromide which is contaminated with its isomer 2-bromo-1-chloropropane, in this composition.

By the method of this invention, the foregoing composition comprising trimethylene chlorobromide as its principal toxic agent is applied uniformly to the soil to be fumigated, preferably below the surface of the soil in an amount which provides at least 3 gallons per acre, and preferably about 6 gallons per acre of the trimethylene chlorobromide, when it is present as the sole toxic ingredient of the composition. Usually an amount in excess of about 12 gallons per acre is not necessary to completely destroy the nematodes and other invertebrate pests in the soil and the excess is merely wasted. The minimal quantity of the trimethylene chlorobromide required to completely destroy the nematodes in soil depends upon the nature and condition of the soil.

This invention is the result of my research to locate organic compounds which are more effective than either ethylene dibromide or 1-chloro-2,3-dibromopropane for the fumigation of soil to destroy nematodes. The effectiveness of ethylene dibromide and 1-chloro-2,3-dibromopropane suggests, of course, the bromine atom renders an organic compound toxic to invertebrates and the effectiveness of 1-chloro-2,3-dibromopropane further suggests that the chlorine atom contributes to the toxicity of an organic compound in view of the fact that organic compounds containing only chlorine are effective insecticides. Further, it can be postulated that the effectiveness of a compound will be proportional to the percentage, by weight, of the halogens contained in the compound.

My research has demonstrated that the toxicity of a compound to soil-infesting invertebrates is quite specifically determined by the structure of the compound, and that the percentage, by weight, of halogen contained in the compound is not a reliable guide to the effectiveness of the compound as a fumigant. As demonstrated hereinafter by reference to specific data obtained under carefully controlled conditions, trimethylene chlorobromide (3-bromo-1-chloropropane) is considerably more effective as a fumigant than its isomer 2-bromo-1-chloropropane, although the latter is a useful toxic agent. Further, it is shown that trimethylene chlorobromide (3-bromo-1-chloropropane) is more effective than either ethylene dibromide or 1-chloro-2,3-dibromopropane despite the fact that it contains a lower percentage, by weight, of the halogens than either of the latter compounds.

Trimethylene chlorobromide is produced by the addition of hydrogen bromide to allyl chloride in the presence of a peroxide catalyst, such as, benzoyl peroxide. The normal mode of addition of hydrogen bromide to the unsaturated bond of allyl chloride is for the hydrogen to become attached to the carbon carrying the greater number of hydrogen atoms, while the bromine atom becomes affixed to the carbon carrying the lesser number of hydrogen atoms. Such addition of hydrogen bromide to allyl chloride produces 2-bromo-1-chloropropane. The presence of the peroxide catalyst tends to reverse this normal mode of addition of hydrogen bromide to allyl chloride to produce trimethylene chlorobromide (3-bromo-1-chloropropane). However, the crude product resulting from this addition in the presence of a peroxide catalyst is normally a mixture containing a preponderance of trimethylene chlorobromide and a minor amount of the isomeric, 2-bromo-1-chloropropane, together with a small percentage of unreacted allyl chloride. A trimethylene chlorobromide of reasonably high purity is obtained from the crude product by fractional distillation under vacuum of the order of 80 mm. absolute pressure.

The fact that 2-bromo-1-chloropropane is toxic to invertebrates is fortunate, since it is formed as a by-product in the reaction by which trimethylene chlorobromide is ordinarily produced. The residual allyl chloride which is present in the compound also shows some nematocidal activity. In my research, I have been able to detect little, if any, difference in the effectiveness of relatively pure trimethylene chlorobromide and of crude trimethylene chlorobromide which carries the by-product 2-bromo-1-chloropropane in an amount, for example, within the range of about 6%, by weight, to about 14%, by weight, and about 1%, by weight, of unreacted allyl chloride. The crude trimethylene chlorobromide is, of course, cheaper to produce than the purified compound. Thus, by the use of the crude product, I am able to reduce the cost of carrying out my method.

In carrying out this method, the composition comprising trimethylene chlorobromide is preferably introduced into the soil at a level well below its surface, since the trimethylene chlorobromide is effective in destroying nematodes and other invertebrate pests in the soil both above and below the level at which it is introduced into the soil. In this respect, trimethylene chlorobromide offers an outstanding advantage over the toxic agents which have heretofore been used for the destruction of nematodes.

The composition, in accordance with this invention, comprising trimethylene chlorobromide may be a liquid in the form of an aqueous emulsion of the trimethylene chlorobromide in which the trimethylene chlorobromide is the disperse phase, or it may be a solution of trimethylene chlorobromide in a suitable inert, organic solvent. In the embodiment of the invention in which the liquid composition is a solution, it may contain about 2.5%, by volume, to about 85%, by volume, of trimethylene chlorobromide and, preferably, about 50%, by volume, to about 75%, by volume, thereof. In general, it is desirable to use a concentration of at least 25%, by volume, of trimethylene chlorobromide in the composition for the effective control of nematocides.

A wide variety of volatile organic compounds are suitable for use as the solvent in the composition in accordance with this invention. It may, for example, be a hydrocarbon solvent, such as, for example, a petroleum naphtha, mineral spirits, toluene or xylene, which is relatively free of high boiling constituents. I prefer to use a hydrocarbon solvent which has a flash point above 80° F. which boils substantially completely below 520° F. Again, the carrier solvent may be a halogenated hydrocarbon, such as, for example, carbon tetrachloride, ethylene dichloride, n-propyl chloride, 1,2-dichloropropane and the like. Chlorinated hydrocarbon solvents which boil within the range of about 40° C. to about 150° C. are satisfactory for this purpose. Similarly, other volatile organic solvents may be employed, provided they do not react with the trimethylene chlorobromide in the composition or interfere with the subsequent utilization of the soil for agricultural purposes.

Commercial petroleum fractions having the specifications shown by Table I are fully representative of suitable petroleum solvents for use in this composition.

TABLE I

| Solvent | A | B | C |
|---|---|---|---|
| Specific gravity | 0.7678 | 0.7874 | |
| Weight per U.S. gallon at 60°F., lbs | 6.392 | 6.556 | |
| Acidity | (1) | (1) | |
| Flash T.C.C., ° F | 107 | 167 | 210 |
| A.S.T.M. distillation: | | | |
| Initial boiling point, ° F | 313 | 387 | 434 |
| Final boiling point, ° F | 377 | 465 | 506 |

¹ Neutral.

As brought out hereinafter by specific data, relatively concentrated solutions of crude trimethylene chlorobromide in these solvents are as effective in killing nematodes as the undiluted crude trimethylene chlorobromide itself. That data also shows that compositions of crude trimethylene chlorobromide and the higher boiling Solvent C are more effective than the corresponding compositions in which Solvents A and B are used.

As noted above, the composition in accordance with this invention may be in the form of an aqueous emulsion. Trimethylene chlorobromide is difficult to emulsify even with the use of relatively large quantities of an emulsifier, and the stability of the emulsions is poor. I have found, however, that when the compound is diluted with a miscible solvent, that the resulting solution may be readily emulsified to form satisfactorily stable emulsions with the use of reasonable amounts of an emulsifying agent. The solvent employed may be any of those mentioned above for use as carriers for the trimethylene chlorobromide. The concentration of the trimethylene chlorobromide in the solution will range from about 20% to about 80%. The amount of emulsifier required, depending upon the particular emulsifier or emulsifiers chosen, will range from about 2% to as high as 15%. The higher concentrations of the trimethylene chlorobromide in the solution to be emulsified require larger quantities of the emulsifying agent.

In general, I prefer to prepare an emulsifiable concentrate of a solution of the trimethylene chlorobromide in a suitable solvent which may be readily emulsified in water at or near the location of ultimate application to the soil. The emulsifier utilized in the emulsifiable concentrate may be either cationic, anionic or non-anionic. In general, cationic emulsifiers are preferable for this purpose. Suitable emulsifiers for this purpose are partially neutralized sodium or potassium salts of sulfonated animal, vegetable or fish oils, sodium petroleum sulfonates, sodium or potassium salts of the sulfated fatty alcohols and the like.

The composition in accordance with this invention may consist of trimethylene chlorobromide dispersed in and on a subdivided solid carrier. Sawdust, wood chips, ground nut shells, coarse wood flour, ground ceramics and expanded mica are suitable for this purpose. Again, the solid carrier may be an organic or inorganic type fertilizer to permit the fertilization of the soil and the destruction of the invertebrate pests therein in a single operation. In general, I prefer to use a carrier which has a relatively coarse particle size with the range of 0.01 inch to about 0.5 inch in size. These compositions may be prepared by wetting the carrier with the trimethylene chlorobromide, and draining off the excess liquid. The exact proportions of the trimethylene chlorobromide and the solid carrier in the composition will vary over a wide range depending upon the absorptive and adsorptive properties of the carrier and its state of subdivision. In general, the amount of the trimethylene chlorobromide utilized is about one to about five times the weight of the carrier.

In carrying out the method in accordance with this invention, the composition comprising trimethylene chlorobromide and a liquid or solid carrier may be applied to the surface of the soil or it may be introduced below the surface of the soil. When in the form of an aqueous emulsion it may be fed into irrigation water being applied to fields. Ordinarily, it is desirable to deposit the composition approximately half-way between the surface of the soil and the lowest level of the soil which is inhabited by nematodes and other invertebrate pests, which in fields is ordinarily the top of the uncultivated sub-soil. As already noted the trimethylene chlorobromide migrates both upwardly and downwardly, as well as laterally, through the soil.

The apparatus which is used to deposit the composition below the surface of the soil will depend upon whether it is a liquid or a solid. The liquid compositions, whether in the form of a solution of the trimethylene chlorobromide in a volatile organic solvent or in the form of an aqueous emulsion, may be distributed through the soil by a drilling technique or by spot injection. In the application of the composition by a drilling operation, which is preferred for operation over a large area, a convenient apparatus consists of a plurality of steel blades or shanks, 12 to 18 inches apart, to which are attached tubes connected to a reservoir containing the fumigant composition. These tubes deliver the composition under pressure behind each blade, below the surface of the soil. Following the introduction of the solution into the soil, it is generally desirable to close the furrows made by the steel blades or shanks by the use of a drag or similar equipment and thereby cover the freshly deposited fumigant.

In an injection operation, a syringe type applicator or other suitable device may be employed to deliver a measured quantity of the fumigant material into the soil at spaced intervals. An injection operation is convenient for use in the fumigation of green-house soil or in relatively small garden or field areas.

The solid compositions in accordance with this invention may be applied to soil by broadcast on the surface followed by mixing with a disk harrow. Again, they may be applied at greater depths by chisel or plow applications. The chisel or plow methods of application are generally preferable to the disk harrow application, since they place the compositions at a greater depth in the soil which permits the trimethylene chlorobromide to permeate deeper into the soil and destroy nematodes to the sub-soil level as well as destroying those above the level at which the compositions are deposited in the soil.

Regardless of the technique by which this fumigant composition is deposited in the soil, it is desirable to deposit it at a level approximately half-way between the surface of the soil and the lowest level of the soil which is inhabited by nematodes and other invertebrate pests, which in fields is ordinarily the top of the uncultivated sub-soil. As already noted, this composition migrates both upwardly and downwardly, as well as laterally through the soil, to provide effective destruction of the pests in all directions from its point of deposition. As will be shown hereafter by the data presented by Table II, the trimethylene chlorobromide permeates the soil both upwardly and downwardly to a distance of at least twelve inches in each direction.

As noted hereinbefore, the compositions in accordance with this invention are applied to soil in an amount which provides at least 3 gallons of trimethylene chlorobromide per acre. It is desirable for economic reasons to apply the minimal quantity of the composition which will effectively destroy the nematode population in the soil. The minimal quantity required depends upon the character of the soil, the extent of its tillage at the time the compositions are applied, the moisture content of the soil and the ambient temperature.

Clay and muck soils require more of the trimethylene chlorobromide for effective destruction of the nematodes than sandy soils. Temperature and moisture conditions are also more critical with the heavier soils. Soil temperatures at a six inch depth within the range of 50° F. to 80° F. are desirable when my compositions are applied to the soil, and I prefer to apply them when the soil temperature is within the range of 65° F. to 75° F. Temperatures below 50° F. slow down the movement of the trimethylene chlorobromide through the soil, while temperatures above 80° F. tend to cause the material to move through the soil at a fast rate which permits the nematodes to survive the passage of the material.

The soil moisture should be at a suitable level to permit seed germination when my compositions are applied to the soil. I have found, for example, that a moisture level approximating 75% of saturation is entirely satisfactory. Excessive moisture in the soil slows down the diffusion of the trimethylene chlorobromide through the soil, while too little water prohibits adequate soil packing to seal the trimethylene chlorobromide in the soil.

The temperature and moisture content of the soil at the time my compositions are applied to the soil are important from the standpoint of the susceptibility of the nematodes to the action of the trimehylene chlorobromide. In hot, dry soils the nematodes are usually in a resting state in which they are resistant to the action of the trimethylene chlorobromide, whereas in warm moist soil they are susceptible to its action.

The preparation of the soil at the time my compositions are applied is of importance for three reasons. The trimethylene chlorobromide does not readily penetrate hard clots and tends to by-pass them. Crop residues in the soil tend to permit the trimethylene chlorobromide to escape from the soil before it has destroyed the nematode population therein. The crop residues, particularly when still living, harbor the parasitic nematodes, such as the rootknot nematode and protect them from the action of the trimethylene chlorobromide.

Table II presents data secured by a series of parallel fumigation screening tests in which the effectiveness of trimethylene chlorobromide and mixtures of trimethylene chlorobromide with different percentages of methyl bromide in the destruction of nematodes in soil when used at different concentrations are compared with the effectiveness of ethylene dibromide, ethyl bromide, 1,3-dibromo-2-propanol and its own isomer 2-bromo-1-chloropropane.

TABLE II

*Fumigation Screening Tests by "Soil Layering Technique" Comparing the Effectiveness of Trimethylene Chlorobromide With Other Compounds as Toxic Agents for the Destruction of Nematodes*

| | Vertical distance in inches from point of deposit of compound ||||||||||||| 
|---|---|---|---|---|---|---|---|---|---|---|---|---|
| | 12 | 10 | 8 | 6 | 4 | 2 | 0 | 2 | 4 | 6 | 8 | 10 | 12 (top) |
| Control (no treatment) | + | + | + | + | + | + | | + | + | + | + | + | + |
| Ethylene dibromide: | | | | | | | | | | | | | |
|  25 gal./acre | − | − | − | − | − | − | | − | − | − | − | − | − |
|  12.5 gal./acre | ± | − | − | − | − | − | | − | − | − | − | ± | ± |
|  6 gal./acre | + | + | + | + | − | − | | − | − | + | + | + | + |
| Ethyl bromide: | | | | | | | | | | | | | |
|  25 gal./acre | + | + | ± | − | − | − | | − | − | − | + | + | + |
|  12.5 gal./acre | + | + | + | ± | + | + | | − | ± | + | + | + | + |
|  6 gal./acre | + | + | + | + | + | + | | + | + | + | + | + | + |
| 1,3-dibromo-2-propanol: | | | | | | | | | | | | | |
|  25 gal./acre | + | + | + | ± | − | − | | − | − | + | + | + | ± |
|  12.5 gal./acre | + | + | + | + | + | − | | − | + | + | + | + | ± |
|  6 gal./acre | + | + | + | + | + | − | | − | + | + | + | + | + |
| 1-chloro-2,3-dibromopropane: | | | | | | | | | | | | | |
|  25 gal./acre | − | − | − | − | − | − | | − | − | − | − | − | − |
|  12.5 gal./acre | − | − | − | − | − | − | | − | − | − | − | − | − |
|  6 gal./acre | + | + | + | + | − | − | | − | − | + | + | + | + |
| 2-bromo-1-chloropropane: | | | | | | | | | | | | | |
|  25 gal./acre | ± | − | − | − | − | − | | − | − | − | − | − | ± |
|  12.5 gal./acre | + | − | − | − | − | − | | − | − | − | + | + | + |
|  6 gal./acre | + | + | + | + | − | − | | − | − | + | + | + | + |
| Trimethylene chlorobromide (3-bromo-1-chloropropane): | | | | | | | | | | | | | |
|  25 gal./acre | − | − | − | − | − | − | | − | − | − | − | − | − |
|  12.5 gal./acre | − | − | − | − | − | − | | − | − | − | − | − | − |
|  6 gal./acre | − | − | − | − | − | − | | − | − | − | − | − | − |
|  3 gal./acre | − | − | − | − | − | − | | − | − | − | − | − | − |
|  1 gal./acre | + | + | − | − | − | − | | − | − | − | + | + | + |
| 5% methylbromide—95% trimethylene chlorobromide: | | | | | | | | | | | | | |
|  25 gal./acre | − | − | − | − | − | − | | − | − | − | − | − | − |
|  12.5 gal./acre | − | − | − | − | − | − | | − | − | − | − | − | − |
|  6 gal./acre | − | − | − | − | − | − | | − | − | − | − | − | − |
|  3 gal./acre | + | − | − | − | − | − | | − | − | − | − | + | ± |
|  1 gal./acre | + | + | + | + | + | − | | − | + | + | + | + | + |
| 10% methylbromide—90% trimethylene chlorobromide: | | | | | | | | | | | | | |
|  25 gal./acre | − | − | − | − | − | − | | − | − | − | − | − | − |
|  12.5 gal./acre | − | − | − | − | − | − | | − | − | − | − | − | − |
|  6 gal./acre | − | − | − | − | − | − | | − | − | − | − | − | − |
|  3 gal./acre | + | − | − | − | − | − | | − | − | − | − | − | ± |
|  1 gal./acre | + | + | + | + | + | − | | − | + | + | + | + | + |
| 15% methylbromide—85% trimethylene chlorobromide: | | | | | | | | | | | | | |
|  25 gal./acre | − | − | − | − | − | − | | − | − | − | − | − | − |
|  12.5 gal./acre | − | − | − | − | − | − | | − | − | − | − | − | − |
|  6 gal./acre | − | − | − | − | − | − | | − | − | − | − | − | − |
|  3 gal./acre | + | − | − | − | − | − | | − | − | − | − | − | ± |
|  1 gal./acre | + | + | + | + | + | − | | − | + | + | + | + | + |
| 20% methylbromide—80% trimethylene chlorobromide: | | | | | | | | | | | | | |
|  25 gal./acre | − | − | − | − | − | − | | − | − | − | − | − | + |
|  12.5 gal./acre | − | − | − | − | − | − | | − | − | − | − | − | − |
|  6 gal./acre | − | − | − | − | − | − | | − | − | − | − | − | − |
|  3 gal./acre | + | − | − | − | − | − | | − | − | − | − | − | ± |
|  1 gal./acre | + | + | + | + | + | − | | − | + | + | + | + | + |

Note.—The + means no kill or toxic symptoms in the nematode population. The ± means some kill toxic symptoms in the nematode population. The − means 100% kill of the nematode population.

As will be seen from the data presented by Table II, trimethylene chlorobromide and its respective mixtures with 5%, 10%, 15% and 20%, by weight, of methyl bromide are equally effective in the destruction of nematodes above and below the point at which they are introduced into the soil. Further, it will be noted that in an amount as low as that corresponding to an application of six gallons per acre, both the trimethylene chlorobromide and its mixtures with methyl bromide destroy nematodes as far as twelve inches below and twelve inches above the point at which they are introduced making possible the complete destruction of nematodes in soil to a depth of twenty-four inches.

At dosage levels as low as 3 gallons per acre the trimethylene chlorobromide is effective for eight inches in each direction from its point of introduction into the soil, while its mixtures with methyl bromide are effective for ten inches in each direction.

Further, it will be noted that the trimethylene chlorobromide and its mixtures with methyl bromide are more effective at a dosage level of 3 gallons per acre, then ethylene dibromide was at twice that dosage level. At a dosage level of 3 gallons per acre, the trimethylene chlorobromide and its mixtures with methyl bromide, were almost as effective as 1-chloro-2,3-dibromopropane at a dosage level of 12.5 gallons per acre and far more effective than the 1-chloro-2,3-dibromopropane at a dosage level of 6 gallons per acre.

Also, it will be noted from the data of Table II that at the lower dosage levels both the commercially used ethylene dibromide and the 1,2-dibromo-3-chloropropane drop rapidly in effectiveness. Thus, at dosage levels of 6 gallons per acre ethylene dibromide is effective for only four inches below and above the point at which it is introduced, while 1,2-dibromo-3-chloropropane is effective for only two inches below and point of introduction and four inches above that point, as compared with the twelve inch effectiveness in each direction of the trimethylene chlorobromide (2-bromo-1-chloropropane) and of its various mixtures with methyl bromide. It will be noted also that the isomer of trimethylene chlorobromide, 2-bromo-1-chloropropane, is definitely toxic to nematodes and only slightly less so than ethylene dibromide. As noted hereinbefore, this is important since it is the impurity in crude trimethylene chlorobromide. Further, this data shows that both ethyl bromide and 1,3-dibromo-2-propanol are less effective in the destruction of nematodes than either ethylene dibromide or 1,2-dibromo-3-chloropropane.

As mentioned hereinbefore, my research has shown that the toxicity of a halogenated organic compound is specifically dependent upon its structure. This data of Table II emphasizes this fact and demonstrates the impossibility of accurately predicting the performance of one compound as a toxic agent for the destruction of nematodes, from that of closely related compounds. Thus, 1,3-dibromo-2-propanol is considerably less effective than either 2-bromo-1-chloropropane or trimethylene chlorobromide (3-bromo-1-chloropropane). This fact is even more strikingly illustrated by a comparison of the data of Table II obtained with trimethylene chlorobromide and with its isomer 2-bromo-1-chloropropane.

Table III presents data secured by a series of parallel green-house fumigation tests in which the effectiveness of a crude trimethylene chlorobromide, of ethylene dibromide and of 1,2-dibromo-3-chloropropane in the destruction root-lesion nematode (*Pratylenchus minyus*), root-knot nematode (*Meloidogyne hapla*) and sugar beet nematode (*Heterodera schachtii*). The crude trimethylene chlorobromide used in this series of tests consisted of 93.1%, by weight, of trimethylene chlorobromide and 6.2%, by weight, of 2-bromo-1-chloropropane and 0.7%, by weight, of allyl chloride.

In the green-house fumigation tests which resulted in the data presented by Table III the various nematocides and candidate nematocides were tested against the different parasitic nematocides and their eggs naturally infesting soils. Soils naturally infested with each of the species of nematocides mentioned above, and their eggs were placed in fumigation chambers 24 inches high with a volume of 0.353 cubic foot. In each test a nematocide or a candidate nematocide was introduced into the vertical midpoint of the fumigation chamber in an amount equivalent to the field dosage rate shown by Table III. After 48 hours, each successive two inch layer of soil was removed from the fumigation chamber, placed in a disposable paper container, planted with a host plant which was then allowed to grow in a green-house for about thirty days. Controls of non-treated soils were similarly planted for comparative purposes. At the end of the thirty-day period, the plants and the soil in which they were growing were inspected to determine presence or absence of a surviving nematode population.

The particular nematodes selected for the tests which resulted in the data presented by Table III are representative of nematodes which live in three different ways. The root-lesion nematode is representative of the migratory life form which is usually free in the soil at the time of fumigation. The sugar beet nematode, *Heterodera schachtii*, is representative of a cyst-forming nematode which protect their larval and their eggs by a cyst wall. The root-knot nematode, *Meloidogyne hapla* is representative of a gall-forming nematode which embeds itself in plant tissue and is protected by the tissue. The eggs of all three forms appear in the naturally infested soil.

TABLE III

*Green-House Fumigation Tests Comparing the Effectiveness of Crude Trimethylene Chlorobromide With Commercial Nematocides for the Destruction of Representative Species of Nematodes*

|  | Vertical distance in inches from point of deposit of compound ||||||||||||
|---|---|---|---|---|---|---|---|---|---|---|---|---|
|  | 12 | 10 | 8 | 6 | 4 | 2 | 0 | 2 | 4 | 6 | 8 | 10 | 12 (top) |
| Control (no treatment) | + | + | + | + | + | + |  | + | + | + | + | + | + |
| ROOT-LESION NEMATODE |
| Crude trimethylene chlorobromide: |
| 25 gal./acre | − | − | − | − | − | − |  | − | − | − | − | − | − |
| 12.5 gal./acre | − | − | − | − | − | − |  | − | − | − | − | − | − |
| 6 gal./acre | − | − | − | − | − | − |  | − | − | − | − | + | + |
| Ethylene dibromide: |
| 25 gal./acre | − | − | − | − | − | − |  | − | − | − | − | − | − |
| 12.5 gal./acre | + | + | − | − | − | − |  | − | − | − | + | + | + |
| 6 gal./acre | + | + | + | + | − | − |  | − | − | + | + | + | + |
| 1,2-dibromo-3-chloropropane: |
| 25 gal./acre | − | − | − | − | − | − |  | − | − | − | − | − | − |
| 12.5 gal./acre | + | − | − | − | − | − |  | − | − | − | − | − | − |
| 6 gal./acre | + | + | + | + | − | − |  | − | − | − | + | + | + |
| ROOT-KNOT NEMATODE |
| Crude trimethylene chlorobromide: |
| 25 gal./acre | − | − | − | − | − | − |  | − | − | − | − | − | − |
| 12.5 gal./acre | − | − | − | − | − | − |  | − | − | − | − | − | − |
| 6 gal./acre | + | − | − | − | − | − |  | − | − | − | − | − | − |
| Ethylene dibromide: |
| 25 gal./acre | − | − | − | − | − | − |  | − | − | − | − | − | − |
| 12.5 gal./acre | + | + | + | − | − | − |  | − | − | + | + | + | + |
| 6 gal./acre | + | + | + | + | − | − |  | − | − | + | + | + | + |
| 1,2-dibromo-3-chloropropane: |
| 25 gal./acre | − | − | − | − | − | − |  | − | − | − | − | − | − |
| 12.5 gal./acre | + | + | − | − | − | − |  | − | − | − | − | − | + |
| 6 gal./acre | + | + | + | + | − | − |  | − | − | − | + | + | + |
| SUGAR BEET NEMATODE |
| Crude trimethylene chlorobromide: |
| 25 gal./acre | + | + | − | − | − | − |  | − | − | − | − | − | − |
| 12.5 gal./acre | + | + | + | + | − | − |  | − | − | − | − | + | + |
| 6 gal./acre | + | + | + | + | − | − |  | − | − | − | + | + | + |
| Ethylene dibromide: |
| 25 gal./acre | − | − | − | − | − | − |  | − | − | − | − | − | − |
| 12.5 gal./acre | + | + | + | + | − | − |  | − | − | + | + | + | + |
| 6 gal./acre | + | + | + | + | + | − |  | − | − | + | + | + | + |
| 1,2-dibromo-3-chloropropane: |
| 25 gal./acre | + | + | + | − | − | − |  | − | − | − | − | + | + |
| 12.5 gal./acre | + | + | + | − | − | − |  | − | − | − | − | + | + |
| 6 gal./acre | + | + | + | + | − | − |  | − | − | − | + | + | + |

NOTE.—The + means that there was a surviving nematode population. The − means that the destruction of the nematode population was complete.

It will be noted from the data of Table III that crude trimethylene chlorobromide is definitely more effective in the destruction of root-leison nematodes than either the commercially used ethylene dibromide or the 1,2-dibromo-3-chloropropane. It will be noted that this data shows that at a dosage level of 6 gallons per acre, the crude trimethylene chlorobromide is more effective than ethylene dibromide at a dosage level of 12.5 gallons per acre, and about equivalent to the 1,2-dibromo-chloropropane at the 12.5 gallons per acre dosage level. As noted above, the root-lesion nematode is representative of nematodes which are largely free in the soil at the time of fumigation.

The crude trimethylene chlorobromide is even more effective in the destruction of root-knot nematodes, which is representative of nematodes which embed themselves in plant tissue. It will be noted that at a dosage level of 6 gallons per acre, the trimethylene chlorobromide is definitely more effective than either ethylene dibromide or 1,2-dibromo-3-chloropropane at more than double this dosage level.

The sugar beet nematode and related nematodes which form cysts to protect their larvae and eggs are effectively destroyed by trimethylene chlorobromide. As shown by the data of Table III, at a dosage level of six gallons per acre the crude trimethylene chlorobromide is more effective than eiter the ethylene dibromide or the 1,2-dibromo-3-chloropropane. At the higher dosage levels, crude trimethylene chlorobromide is somewhat more effective than 1,2-dibromo-3-chloropropane, but somewhat less effective than ethylene dibromide. In considering this comparison, it will be appreciated that the effectiveness of these compounds at low dosage levels in the destruction of the cyst-forming nematodes is the important comparison. Obviously, the high dosage levels are undesirable both from an economic standpoint and from the standpoint of undesirable side effects of high concentrations of the compounds in soil.

Table IV presents comparative data obtained by fumigation tests by the "soil layering" technique described hereinbefore with reference to Table II of a series of solutions of crude trimethylene chlorobromide in Solvent A and in Solvent B, the specifications of which are given by Table I. By reference to Table I it will be seen that Solvent A is a petroleum hydrocarbon solvent boiling within the range of 313° F. to 377° F. while solvent B is a higher boiling petroleum hydrocarbon solvent boiling within the range of 387° F. to 465° F.

TABLE IV

*Fumigation Screening Tests by the "Soil Layering" Technique Comparing the Effectiveness of Crude Trimethylene Chlorobromide and of a Series of Solutions of Crude Trimethylene Chlorobromide in Solvent A and Solvent B (Table I), Respectively*

|  | Vertical distance in inches from point of deposit of compound ||||||||||||
|---|---|---|---|---|---|---|---|---|---|---|---|---|
|  | 12 | 10 | 8 | 6 | 4 | 2 | 0 | 2 | 4 | 6 | 8 | 10 | 12 (top) |
| Control (no treatment) | + | + | + | + | + | + |  | + | + | + | + | + | + |
| Crude trimethylene chlorobromide: |
| 25 gal./acre | − | − | − | − | − | − |  | − | − | − | − | − | − |
| 12.5 gal./acre | − | − | − | − | − | − |  | − | − | − | − | − | − |
| 6 gal./acre | − | − | − | − | − | − |  | − | − | − | − | − | + |
| 40% by weight crude trimethylene chlorobromide—60% by weight solvent A: |
| 25 gal./acre | + | + | − | − | − | − |  | − | − | − | − | + | + |
| 12.5 gal./acre | + | + | + | − | − | − |  | − | − | + | + | + | + |
| 6 gal./acre | + | + | + | + | − | − |  | − | + | + | + | + | + |
| 60% by weight crude trimethylene chlorobromide—40% by weight solvent A: |
| 25 gal./acre | + | − | − | − | − | − |  | − | − | − | − | − | + |
| 12.5 gal./acre | + | − | − | − | − | − |  | − | − | − | − | + | + |
| 6 gal./acre | + | + | − | − | − | − |  | − | − | − | + | + | + |
| 80% by weight crude trimethylene chlorobromide—20% by weight solvent A: |
| 25 gal./acre | − | − | − | − | − | − |  | − | − | − | − | − | − |
| 12.5 gal./acre | − | − | − | − | − | − |  | − | − | − | − | − | − |
| 6 gal./acre | + | − | − | − | − | − |  | − | − | − | − | + | + |
| 40% by weight crude trimethylene chlorobromide—60% by weight solvent B: |
| 25 gal./acre | − | − | − | − | − | − |  | − | − | − | − | − | + |
| 12.5 gal./acre | + | − | − | − | − | − |  | − | − | − | + | + | + |
| 6 gal./acre | + | + | + | − | − | − |  | − | ± | ± | + | + | + |
| 60% by weight crude trimethylene chlorobromide—40% by weight solvent B: |
| 25 gal./acre | − | − | − | − | − | − |  | − | − | − | − | − | − |
| 12.5 gal./acre | − | − | − | − | − | − |  | − | − | − | − | − | − |
| 6 gal./acre | + | ± | − | − | − | − |  | − | − | − | − | + | + |
| 80% by weight crude trimethylene chlorobromide—20% by weight solvent B: |
| 25 gal./acre | − | − | − | − | − | − |  | − | − | − | − | − | − |
| 12.5 gal./acre | − | − | − | − | − | − |  | − | − | − | − | − | − |
| 6 gal./acre | ± | − | − | − | − | − |  | − | − | − | − | − | − |

NOTE.—The + means no kill or toxic symptoms in the nematode population. The ± means some kill and toxic symptoms in the nematode population. The − means 100% kill of the nematode population.

It will be noted from the data of Table IV that the solutions of crude trimethylene chlorobromide in Solvent B were more effective than those in Solvent A.

Table V presents comparative data obtained by the "Soil layering" technique in which solutions of crude trimethylene chlorobromide in Solvent B are compared with solutions of crude trimethylene chlorobromide in the still higher boiling Solvent C. Reference to Table I shows that Solvent C boils within the range of 434° F. to 506° F. as compared with the boiling range of 387° F. to 465° F. of Solvent B. The solutions tested to obtain the data of Table V were prepared on a volumetric basis, rather than on a weight basis as in the case of the solutions used in obtaining the data of Table IV.

TABLE V

*Fumigation Screening Tests by the "Soil Layering" Technique Comparing the Effectiveness of Crude Trimethylene Chlorobromide and of a Series of Solutions of Crude Trimethylene Chlorobromide in Solvent B and solvent C (Table I), Respectively*

|  | Vertical distance in inches from point of deposit of compound ||||||||||| |
|---|---|---|---|---|---|---|---|---|---|---|---|
|  | 12 | 10 | 8 | 6 | 4 | 2 | 0 | 2 | 4 | 6 | 8 | 10 | 12 (top) |
| Control (no treatment) | + | + | + | + | + | + |  | + | + | + | + | + |
| Crude trimethylene chlorobromide: | | | | | | | | | | | | |
| 25 gal./acre | − | − | − | − | − | − |  | − | − | − | − | − |
| 12.5 gal./acre | − | − | − | − | − | − |  | − | − | − | − | − |
| 6 gal./acre | − | − | − | − | − | − |  | − | − | − | − | − |
| 3 gal./acre | ± | ± | − | − | − | − |  | − | − | − | ± | + |
| 1 gal./acre | + | + | + | + | + | ± |  | − | ± | + | + | + |
| 50% by vol. crude trimethylene chlorobromide—50% by vol. solvent B: | | | | | | | | | | | | |
| 25 gal./acre | − | − | − | − | − | − |  | − | − | − | − | − |
| 12.5 gal./acre | − | − | − | − | − | − |  | − | − | − | ± | ± |
| 6 gal./acre | ± | − | − | − | − | − |  | − | − | ± | ± | ± |
| 3 gal./acre | + | + | + | ± | ± | − |  | − | ± | ± | + | + |
| 1 gal./acre | + | + | + | + | + | ± | ± | + | + | + | + | + |
| 75% by vol. crude trimethylene chlorobromide—25% by vol. solvent B: | | | | | | | | | | | | |
| 25 gal./acre | − | − | − | − | − | − |  | − | − | − | − | − |
| 12.5 gal./acre | − | − | − | − | − | − |  | − | − | − | − | ± |
| 6 gal./acre | ± | − | − | − | − | − |  | − | − | − | ± | + |
| 3 gal./acre | + | + | ± | − | − | − |  | − | − | ± | ± | + |
| 1 gal./acre | + | + | + | + | + | ± | ± | + | + | + | + | + |
| 25% by vol. crude trimethylene chlorobromide—75% by vol. solvent C: | | | | | | | | | | | | |
| 25 gal./acre | ± | ± | − | − | − | − |  | − | − | − | ± | ± |
| 12.5 gal./acre | + | + | ± | ± | − | − |  | − | − | ± | + | + |
| 6 gal./acre | + | + | + | + | + | − |  | − | ± | + | + | + |
| 3 gal./acre | + | + | + | + | + | ± |  | ± | + | + | + | + |
| 1 gal./acre | + | + | + | + | + | ± | ± | + | + | + | + | + |
| 50% by vol. crude trimethylene chlorobromide—50% by vol. solvent C: | | | | | | | | | | | | |
| 25 gal./acre | − | − | − | − | − | − |  | − | − | − | − | − |
| 12.5 gal./acre | − | − | − | − | − | − |  | − | − | − | − | − |
| 6 gal./acre | − | − | − | − | − | − |  | − | − | − | − | − |
| 3 gal./acre | + | + | + | + | ± | − |  | − | − | + | + | + |
| 1 gal./acre | + | + | + | ± | ± | − |  | − | ± | + | + | + |
| 75% by vol. crude trimethylene chlorobromide—25% by vol. solvent C: | | | | | | | | | | | | |
| 25 gal./acre | − | − | − | − | − | − |  | − | − | − | − | − |
| 12.5 gal./acre | − | − | − | − | − | − |  | − | − | − | − | − |
| 6 gal./acre | − | − | − | − | − | − |  | − | − | − | − | ± |
| 3 gal./acre | + | + | + | + | ± | − |  | − | ± | + | + | + |
| 1 gal./acre | + | + | + | + | ± | − |  | − | ± | + | + | + |

NOTE.—The + means no kill or toxic symptoms in the nematode population. The ± means some kill and toxic symptoms in the nematode population. The − means 100% kill of the nematode population.

It will be noted that the solutions of the crude trimethylene chlorobromide in Solvent C were somewhat more effective than those in Solvent B. Further, it will be noted that in the case of both of these solvents the solutions having concentrations of 50% and 75%, by volume, are almost as effective as the crude trimethylene chlorobromide itself. Also, it will be noted that a dosage equivalent to 6 gallons per acre of a 50% solution of the crude trimethylene chlorobromide in Solvent C was somewhat more effective than a dosage of crude trimethylene chlorobromide at the level of 3 gallons per acre.

The fact illustrated by the data of Tables IV and V, that the solutions of crude trimethylene chlorobromide are as effective in killing nematodes as the undiluted trimethylene chlorobromide itself is difficult to explain in view of the fact that the solvents themselves have no nematocidal activity. However, this fact is of importance since the solvents are less expensive than the crude trimethylene chlorobromide and their use reduces the cost of fumigating soil.

In the foregoing, specific details and examples of my product and method have been given for the purpose of fully explaining the invention. However, it will be understood that various changes and modifications can be made without departing from the spirit of my invention or the scope of the following claims.

I claim:

1. A method for the fumigation of soil for the destruction of nematodes therein, which comprises the step of introducing into the soil a composition comprising 1-bromo-3-chloropropane as the principal toxic ingredient and a horticultural carrier material.

2. A method for the fumigation of soil for the destruction of nematodes therein, which comprises the step of introducing into the soil at a level approximating the mid-point of the depth which is to be fumigated, a liquid composition comprising 1-bromo-3-chloropropane dissolved in a volatile, organic solvent therefor.

3. A method for the fumigation of soil for the destruction of nematodes therein, which comprises the step of introducing into the soil at a level approximating the mid-point of the depth which is to be fumigated, a liquid composition comprising 1-bromo-3-chloropropane dissolved in a liquid hydrocarbon having a flash point above 80° F. which boils substantially completely below 510° F.

4. A method for the fumigation of soil for the destruction of nematodes therein, which comprises the step of introducing into the soil, at a level approximating the mid-point of the depth which is to be fumigated, a liquid composition comprising 1-bromo-3-chloropropane dissolved in a liquid chlorinated hydrocarbon having a boiling point within the range of about 40° C. to about 150° C.

5. A method for the fumigation of soil for the destruction of nematodes therein, which comprises the step of introducing into the soil a liquid composition comprising a crude 1-bromo-3-chloropropane in which the primary contaminant is 2-bromo-1-chloropropane, and a volatile liquid, organic solvent therefor.

6. A method for the fumigation of soil for the destruction of nematodes therein, which comprises the step of introducing into the soil, at a level approximating the mid-point of the depth which is to be fumigated, a liquid composition which comprises a crude 1-bromo-3-chloropropane which contains as a contaminant about 6%, by weight, to about 14%, by weight, of 2-bromo-1-chloropropane, and about 1% allyl chloride and a volatile, liquid organic solvent therefor.

7. A method for the fumigation of soil for the destruction of nematodes therein, which comprises the step of introducing into the soil, at a level approximating the mid-point of the depth to which the soil is to be fumigated, a composition comprising solid particles of an inert carrier which are impregnated with 1-bromo-3-chloropropane.

References Cited in the file of this patent

UNITED STATES PATENTS

| | | |
|---|---|---|
| 2,543,580 | Kay | Feb. 27, 1951 |
| 2,695,859 | Hilmer | Nov. 30, 1954 |
| 2,895,872 | Meuli | July 21, 1959 |

FOREIGN PATENTS

| | | |
|---|---|---|
| 124,387 | Australia | June 12, 1947 |
| 203,022 | Australia | Aug. 17, 1956 |

OTHER REFERENCES

King: U.S. Dept. Agr. Handbook No. 69, p. 278, May 1954.

De Ong, Chemistry and Uses of Pesticides, 2nd Ed., pp. 135–140, 1956.

Chem. Abst., vol. 50, page 4787f, 1956.